(12) United States Patent
Imai et al.

(10) Patent No.: US 6,772,489 B2
(45) Date of Patent: Aug. 10, 2004

(54) COLLECTOR FOR ALKALINE SECONDARY BATTERY, METHOD FOR MAKING THE SAME, AND ALKALINE SECONDARY BATTERY USING THE SAME

(75) Inventors: Hiroyuki Imai, Ohmiya (JP); Kaori Yoshida, Ohmiya (JP); Toshiaki Takase, Sarushima-gun (JP); Kazuya Satou, Sarushima-gun (JP)

(73) Assignees: Mitsubishi Materials Corporation, Tokyo (JP); Japan Vilene Company, Ltd., Tokyo (JP)

( * ) Notice: Subject to any disclaimer, the term of this patent is extended or adjusted under 35 U.S.C. 154(b) by 0 days.

(21) Appl. No.: 10/286,798

(22) Filed: Nov. 4, 2002

(65) Prior Publication Data

US 2003/0091902 A1 May 15, 2003

Related U.S. Application Data

(62) Division of application No. 09/783,518, filed on Feb. 21, 2001.

(30) Foreign Application Priority Data

Feb. 21, 2000 (JP) ........................................ 2000-043017
Jan. 10, 2001 (JP) ........................................ 2001-002728

(51) Int. Cl.[7] ............................ H01M 4/80; C25D 5/56
(52) U.S. Cl. ............................. 29/2; 429/236; 205/160; 205/169; 442/52; 442/379
(58) Field of Search .................. 29/2; 429/234–236; 205/160, 161, 164, 166, 167, 169; 442/52, 379

(56) References Cited

U.S. PATENT DOCUMENTS

5,434,023 A * 7/1995 Teraoka et al. ............. 429/223
6,063,143 A * 5/2000 Stepanov et al. .......... 29/623.5

OTHER PUBLICATIONS

Derwent abstract for JP 58–196238 A (publication date of Nov. 1983).*

* cited by examiner

Primary Examiner—Susy Tsang-Foster
(74) Attorney, Agent, or Firm—Oblon, Spivak, McClelland, Maier & Neustadt, P.C.

(57) ABSTRACT

A hydrophilic collector for alkaline secondary batteries is formed of a nonwoven fabric plated with nickel in which the nonwoven fabric is hydrophilized by sulfonation, a gaseous fluorine treatment, or vinyl monomer grafting. A method for making the collector includes a hydrophilizing step of a nonwoven fabric comprising at least one of a polyolefin fiber and a polyamide fiber, and a plating step of applying nickel plating to the hydrophilic nonwoven fabric. Preferably, the nickel plating is electroless plating, and the nonwoven fabric has a plurality of micropores extending from one surface to the other surface thereof. An electroplating film may be deposited on the electroless plated film, if necessary. This collector facilitates assembling a battery which exhibits improved high-rate discharge characteristics due to improved adhesiveness of the plated nickel film to the nonwoven fabric.

6 Claims, 4 Drawing Sheets

10: COLLECTOR
11: NONWOVEN FABRIC
12: PLATED FILM

10: COLLECTOR
11: NONWOVEN FABRIC
12: PLATED FILM

COLLECTOR FOR ALKALINE SECONDARY BATTERY, METHOD FOR MAKING THE SAME, AND ALKALINE SECONDARY BATTERY USING THE SAME

CROSS REFERENCE TO RELATED APPLICATIONS

This application is a division of application Ser. No. 09/783,518 filed on Feb. 21, 2001.

The present application is based on Japanese application 2000-043017, filed on Feb. 21, 2000, and Japanese application 2001-002728, filed on Jan. 10, 2001 which are both hereby incorporated by reference in their entireties.

BACKGROUND OF THE INVENTION

1. Field of the Invention

The present invention relates to a collector for alkaline secondary batteries including a plated nonwoven fabric, to a method for making the same, and to an alkaline secondary battery using the same.

2. Description of the Background

Alkaline secondary batteries, which are highly reliable and are suitable for a reduction in weight, are widely used as power sources for various devices and apparatuses from portable devices to industrial large facilities. In most alkaline secondary batteries, nickel electrodes are used as positive electrodes. A nickel electrode has a structure including a collector for collecting electricity and a positive-electrode active material inducing a cell reaction supported on the collector. As collectors in this case, a sintered nickel plate formed by sintering nickel powder and a punched nickel plate have been widely used. The cell capacity is determined by the volume of the active material loaded in pores in such a nickel plate, and the volume of the loaded active material depends on the porosity of the nickel plate. Thus, it is preferable that the porosity of the nickel plate be as large as possible.

However, in sintered nickel plates and punched nickel plates, the porosity is as low as 75% to 80%. Moreover, the nickel content in a nitrate solution is low. Thus, the loading cycle for impregnation and neutralization must be repeated several times in order to load a predetermined amount of active material. Since the penetration of the nitrate solution into the interior of the nickel plate is impaired as the loading cycle is repeated, high density loading of the active material is barely achieved. Recently, a collector with a three-dimensional network structure has been used in order to enhance loading density of the active material into the collector to meet the requirements for higher capacity of batteries, since this structure has large porosity and thus can has high loading density for the active material.

The collector having the three-dimensional network structure is generally fabricated as follows. A porous network structure, such as a polyurethane foam sheet or an organic nonwoven fabric is plated with nickel by a known process, and is fired in a reducing atmosphere to pyrolyze the polyurethane sheet or the fabric so that the plated nickel network skeleton remains. In the resulting collector, a portion for an external terminal is flattened, the pores are filled with an active material paste, and a small nickel piece as an external terminal is spot-welded to the flattened position. Since the resulting collector has large pores and the porosity is as large as 90 to 98%, pasted nickel hydroxide can be directly loaded into the pores with high loading density. This collector contributes to an increase in capacity of alkaline secondary batteries.

However, this three-dimensional network structure does not have strength required for the collector and is too rigid. Thus, producing an electrode using this collector and assembling the electrode into a battery cause the following problems. When an active material paste with high viscosity is loaded into the collector, the active material paste is injected from the surface into the internal pores of the collector under a predetermined pressure. After the loaded active material paste is dried, the collector is rolled to increase the density and to optimize the electrode thickness, and is cut into pieces with a predetermined size. When the pressure applied to the paste is increased to improve the loading density of the paste, the nickel network skeleton of the collector may buckle or chip. Thus, the pressure on the active material paste must be reduced to avoid such buckling or chipping. However, desirable loading density of the paste is not achieved under a low pressure.

Since the nickel itself constituting the network skeleton is rigid, the network skeleton will leave cracks and projections such as scuffing on the outer periphery of the electrode using this collector, with chipping of the network skeleton in many cases, during winding the collector with a separator in the assembly of a cylindrical storage battery. These projections increase the electrical resistance of the electrode and impair the function of the collector and charge/discharge characteristics of the battery. In a prismatic storage battery using this collector, the collector swells due to a change in volume of the active material during charge/discharge cycles in some cases. Hence, separation may occur between the collector and the active material, or in the active material, resulting in deterioration of charge/discharge characteristics due to deterioration of the collector itself.

In addition, this collector with three-dimensional network structure is produced by many complicated steps with low productivity and relatively high cost. Moreover, the metal, i.e., nickel, which is only the constituent of the collector, precludes a decrease in thickness or weight of the collector. Accordingly, this metallic collector does not sufficiently meet the requirements for a decrease in weight and size.

In order to overcome this problem, Japanese Unexamined Patent Application Publication No. 8-329956 discloses a collector having a three-dimensional network structure. In this collector, a polyurethane foam sheet or a polyolefin nonwoven fabric is plated with nickel so as to impart conductivity to only the surface of the sheet or nonwoven fabric without pyrolyzing the sheet or nonwoven fabric. This collector can be produced by simpler steps, is flexible, and has relatively high strength, in comparison with the above-mentioned pyrolyzed collector with a three-dimensional network structure. No crack or projection causing scuffing forms during winding an electrode using this substrate together with a separator to assemble a cylindrical or prismatic battery. This collector exhibits improved charge/discharge characteristics and can meet the requirement for a reduction in weight and size.

However, in this collector, adhesion is insufficient between the polyurethane foam sheet or polyolefin nonwoven fabric and the plated nickel. When this collector is used as a nickel electrode of a nickel-hydrogen battery, the collector does not have a satisfactory function in a combination with a nickel hydroxide active material. Thus, it is difficult to assemble high-capacity batteries.

Japanese Unexamined Patent Application Publication No. 5-290838 discloses a method for making a nonwoven fabric electrode in which the nonwoven fabric is corona-treated prior to nickel plating. The corona-treated nonwoven fabric exhibits higher bonding strength to the plated layer compared to untreated nonwoven fabrics.

However, in this method, the bonding strength between the base material and the plated layer is still insufficient in practice. When this collector is used as a nickel electrode in a nickel-hydrogen battery, the plated layer undergoes a change in quality or partial scaling during assembling a battery and repeated charge/discharge cycles of the battery. The resulting battery shows a short charge/discharge cycle life at high temperatures, resulting in an abrupt decrease in capacity.

SUMMARY OF THE INVENTION

Accordingly, it is an object of the present invention to provide a collector for an alkaline secondary battery exhibiting improved adhesiveness to plated nickel and a method for making the same.

It is another object of the present invention to provide an alkaline secondary battery which can be easily assembled and exhibits a high discharge rate and improved charge/discharge cycle characteristics.

According to a first aspect of the present invention, a collector for an alkaline secondary battery comprises a nonwoven fabric hydrophilized by sulfonation, gaseous fluorine treatment, or vinyl monomer grafting, and a nickel plating film formed on the nonwoven fabric.

The nonwoven fabric hydrophilized by the above treatment has a uniform and fine negative charge over the entire region. In this collector, the plated nickel film is tightly bonded to the nonwoven fabric, improving conductivity. Moreover, the plated nickel film does not scale off in use in an aqueous 20–35 weight % KOH solution, which is an electrolyte generally used in alkaline secondary batteries, over a long period, preventing an increase in surface resistance.

Preferably, in this alkaline secondary battery, the nonwoven fabric has a plurality of micropores extending from one surface to the other surface thereof. A large amount of active material is thereby loaded into the plurality of micropores, so that the alkaline secondary battery has high capacity.

Preferably, the diameter of the micropores is in the range of 0.1 to 5.0 mm, and the micropore density (the number of micropores per area) in the nonwoven fabric is in the range of 1 to 30/cm$^2$. When the diameter is less than 0.1 mm or the micropore density is less than 1/cm$^2$, a required amount of active material is not loaded. When the diameter exceeds 5.0 mm or the micropore density exceeds 30/cm$^2$, the nonwoven fabric cannot maintain desired mechanical strength.

Preferably, the nonwoven fabric includes crimped fibers. Since the crimped fibers are bulky, the nonwoven fabric has an increased pore volume, which can load an increased amount of active material.

Preferably, the nonwoven fabric is produced by a wet process. The nonwoven fabric by the wet process is uniform with regard to weight and thickness, yielding a uniform electrode. Thus, an electrode with a uniform thickness can be formed using this collector. When this electrode is wound, an electrode group having high adhesiveness is formed, and a battery using the wound electrode exhibits superior charge/discharge characteristics.

According to a second aspect of the present invention, a method for making a collector for an alkaline secondary battery comprises a hydrophilizing step of a nonwoven fabric comprising at least one of a polyolefin fiber and a polyamide fiber, and a plating step of applying nickel plating to the hydrophilic nonwoven fabric.

In this method, the hydrophobic polyolefin or polyamide fiber, which precludes penetration of an aqueous plating solution and nickel plating, is made hydrophilic. Thus, nickel ions are firmly affixed to the surface of the nonwoven fabric in a nickel plating treatment, the plated nickel layer tightly bonded to the nonwoven fabric. The resulting collector exhibits high conductivity.

In this method, the hydrophilizing step preferably includes a treatment selected from sulfonation, gaseous fluorine treating, and vinyl monomer grafting. The nonwoven fabric hydrophilized by the above treatment has a uniform and fine negative charge over the entire region. In this collector, the plated nickel film is tightly bonded to the nonwoven fabric, improving its conductivity. Moreover, the plated nickel film does not scale off in use in an aqueous 20–35 weight % KOH solution, which is an electrolyte generally used in alkaline secondary batteries, over a long period, preventing an increase in surface resistance.

Preferably, in this method, the nonwoven fabric has a plurality of micropores extending from one surface to the other surface thereof.

Since an active material is also loaded into the plurality of micropores, a large amount of active material is loaded so that the alkaline secondary battery has high capacity.

In this method, the nickel plating is preferably electroless plating. The electroless plating facilitates the formation of a plated nickel film an the nonconductive nonwoven fabric.

Preferably, the method further comprises a step of forming an electroplating film by an electroplating process subsequent to the formation of an electroless plating film by the electroless plating.

Since the plated nickel film having a predetermined thickness is tightly bonded to the nonwoven fabric, the resulting collector has desired conductivity.

According to a third aspect of the present invention, an alkaline secondary battery comprises the collector according to the first aspect or a collector manufactured by the method according to the second aspect.

This alkaline secondary battery can be readily assembled using the collector according to the first aspect or the collector manufactured by the method according to the second aspect, and exhibits a, high discharge rate and improved charge/discharge cycle characteristics due to high adhesiveness of the collector to the plated nickel layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The preferred embodiments of the present invention will now be described with reference to the drawings.

Figure 1:
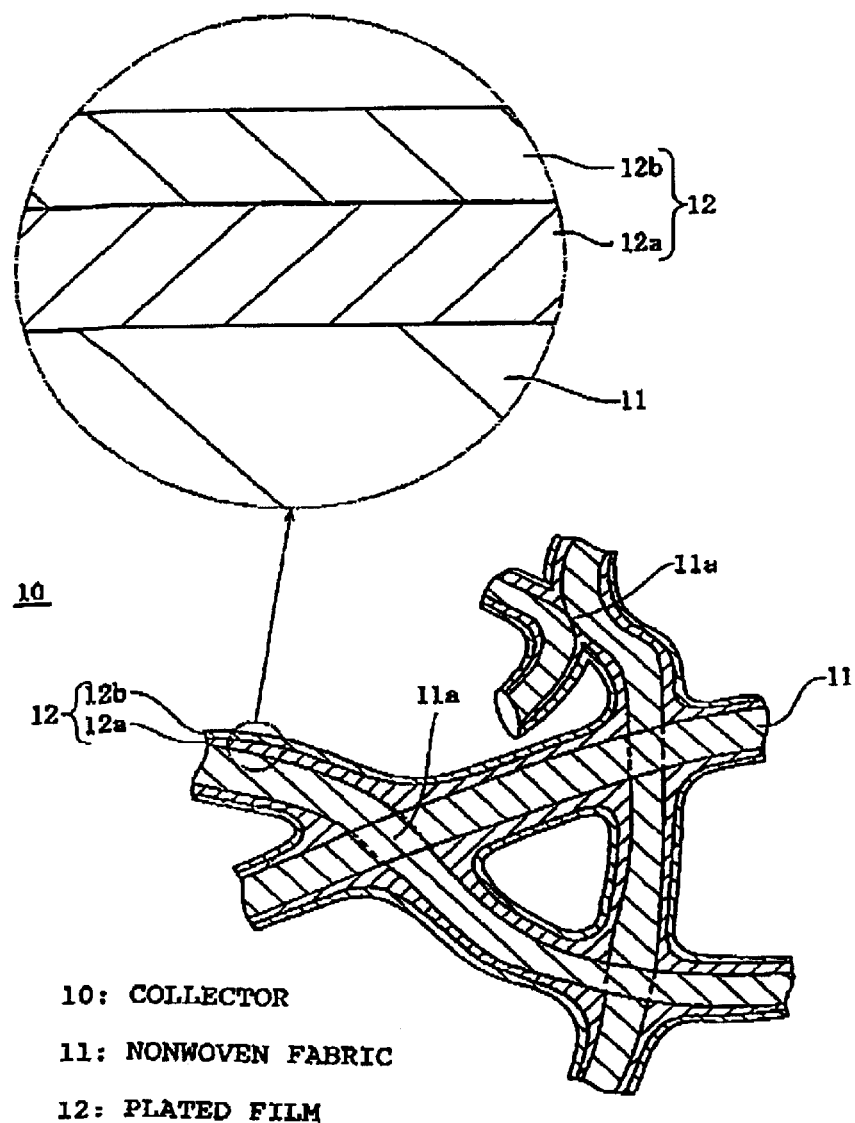
FIG. 1 is an enlarged partial view of a collector including a nonwoven fabric and a plated film in accordance with the present invention.

With reference to FIG. 1, a collector 10 of the present invention includes a nonwoven fabric 11 composed at least one of a polyolefin fiber and a polyamide fiber, and a plated nickel film 12 provided on the surface of the nonwoven fabric 11. Examples of the resin components of the polyolefin fiber include polyethylene, polypropylene, polymethylpentene, ethylene-propylene copolymers, ethylenebutene-propylene copolymers, and ethylene-vinyl alcohol copolymers. Preferably, these resin components are used in combination. Examples of the resin components of the polyamide fiber include nylon-6, nylon-66, nylon-12, and copolymers of nylon-8 and nylon-12. Preferably, these resin components are used in combination.

The collector 10 is formed by hydrophilizing the nonwoven fabric 11 and by plating nickel on the hydrophilic nonwoven fabric 11. Polyolefin fibers and polyamide fibers have been used as separators of batteries. These fibers are resistant to alkali and are not dissolved into an aqueous 20–35 weight % KOH solution. Moreover, these fibers are available at low cost.

In the polyolefin fiber, polyethylene resin and polypropylene resin are preferable due to high alkali resistance and acid resistance. The polyethylene resin and the polypropylene resin may be used alone or in combination. In particular, a core-sheath composite fiber of a polypropylene core and a polyethylene sheath simultaneously satisfying alkali resistance and high strength is preferably used. Any fiber other than the polyolefin fiber and the polyamide fiber may be used as a constituent of the nonwoven fabric in the present invention.

Preferably, the nonwoven fabric includes crimped fibers. The nonwoven fabric including the crimped fibers are bulky and have a large pore volume, which is advantageous to loading of an active material and battery capacity. Moreover, loading of the active material is facilitated by an increased average pore diameter. In the crimped fiber, the density of crimps is preferably 3/inch or more and more preferably 5/inch or more. In order to maintain an adequate porosity, the nonwoven fabric contains the crimped fiber in an amount of preferably at least 5% by weight, more preferably at least 20% by weight, and most preferably at least 50% by weight. The fibers may be mechanically or thermally crimped. Examples of thermally crimpable fibers are side-by-side fibers and eccentric pore-sheath fibers which are composed of two types of resins having different shrinking temperatures.

The nonwoven fabric may be fabricated by (1) a card or air lay process, (2) a dry process such as a melt-blown or spun-bond process, which involves continuous formation of a sheet from a spinning stage, or (3) a wet process dispersing fibers into water and making the nonwoven fabric from the dispersion. In particular, a nonwoven fabric fabricated by a wet process has higher uniformity in the density and the thickness compared to a nonwoven fabric fabricated by a dry process. Thus, a collector using the wet-process nonwoven fabric provides an electrode with a uniform thickness, and the electrode after winding provides an electrode group having high adhesiveness. The resulting battery exhibits superior charge/discharge characteristics.

The porosity of the nonwoven fabric is preferably 70% or more. Herein, the porosity represents the proportion of the pores to the total volume of the nonwoven fabric. A porosity of less than 70% causes a decreased loading density of an active material paste and the resulting collector 10 is not suitable for high-capacity batteries, regardless of high mechanical strength of the nonwoven fabric 11. A significantly high porosity results in a significant decrease in mechanical strength. More preferably, the porosity is in the range of 80 to 98%.

The nonwoven fabric 11, which is produced by the above process, may be used as it is. Preferably, the nonwoven fabric 11 is entangled and heat-treated to enhance mechanical strength prior to use. Examples of entangling treatments are stream entangling, in which ultrafine high-pressure jet streams are impulsively applied, and needle punch entangling. As shown in FIG. 1, the entangled nonwoven fabric has many junction points 11a between filaments and exhibits improved mechanical strength. Moreover, the entangled nonwoven fabric has a smaller thickness and a desirable porosity. The heat treatment is performed to locally melt and bond the filaments at the junction points 11a so as to enhance the overall mechanical strength. However, the heat treatment temperature must be below the pyrolyzing temperature of the fiber to prevent pyrolysis of the fiber.

The heat treatment is performed at a temperature between the softening temperature and the pyrolyzing temperature of the fiber. At a significantly low temperature within the above range, the resulting nonwoven fabric exhibits low mechanical strength due to insufficient hot melting, resulting in damage when an active material paste is loaded. At a significantly high temperature, the porosity decreases due to the melt of the fibers, resulting in a decreased loading density of an active material paste. When the above-mentioned core-sheath composite fiber is used, the heat treating temperature is preferably in the range of 120° C. to 140° C. The entangling treatment and the heat treatment may be independently performed. Preferably, the nonwoven fabric is entangled and is then heated to significantly improve mechanical strength thereof.

The present invention is characterized by hydrophilizing the surface of the nonwoven fabric. Since the polyolefin material such as polypropylene is nonpolar, it precludes permeation of a plating solution and has poor adhesiveness. The above hydrophilizing treatment improves penetrability of a plating solution. Since nickel ions are firmly affixed to the nonwoven fabric, the nonwoven fabric exhibits high conductivity and the plated nickel layer is tightly bonded to then surface of the nonwoven fabric. The nonwoven fabric may be hydrophilized by sulfonation, gaseous fluorine treatment, vinyl monomer grafting, surfactant treatment or hydrophilic resin coating. Among these, sulfonation, gaseous fluorine treatment, and vinyl monomer grafting are preferred, since these treatments do not cause scaling off of the plated metal film and an increase in surface resistance in use over long time in an aqueous 20–35 weight % KOH solution, which is used as an electrolyte solution in batteries.

Sulfonation may be performed by immersion treatment using, for example, fuming sulfuric acid, sulfuric acid, sulfur trioxide, chlorosulfuric acid or sulfuryl chloride. Among these, sulfonation using fuming sulfuric acid is preferably due to high reactivity. Any gaseous fluorine treatment may be effective in the present invention. For example, the nonwoven fabric may be exposed to a mixed gas of gaseous fluorine diluted with an inert gas such as nitrogen or argon, and at least one gas selected from oxygen, carbon dioxide and sulfur dioxide. When the nonwoven fabric is exposed to gaseous sulfur dioxide and then gaseous fluorine, the nonwoven fabric is effectively and permanently hydrophilized. Any vinyl monomer grafting treatment may be used in the present invention. For example, the nonwoven fabric is immersed in a grafting solution containing at least one monomer selected from acrylic acid, methacrylic acid, an acrylic ester, a methacrylic ester, vinylpyridine and styrene, and then is irradiated with ultraviolet rays. Among those monomers, acrylic acid is preferable since this monomer does not cause scaling off of the plated metal film and an increase in surface resistance in use over long time in an aqueous 20–35 weight % KOH solution, which is used as an electrolyte solution.

The resulting hydrophilic nonwoven fabric is subjected to nickel plating. Preferably, the nickel plating is electroless plating. With reference to FIG. 1, an electroplating film 12$b$ may be deposited on an electroless plated film 12$a$ formed by electroless plating, if necessary. The surface of the nonwoven fabric 11 is thereby covered by the plated nickel film 12.

More specifically, the electroless plating process includes a catalyzing step and an electroless plating step. In the catalyzing step, the nonwoven fabric is treated with an aqueous tin(II) chloride-hydrochloric acid solution and is then catalyzed with an aqueous palladium chloride solution. Alternatively, the nonwoven fabric is directly catalyzed with an aqueous palladium solution containing a hardener with amino groups. The former process is preferred since the resulting plated film has a significantly uniform thickness. The electroless plating is generally performed by reduction of nickel ions using a reducing agent in an aqueous solution containing a nickel salt, such as nickel nitrate or nickel sulfate. The plating solution may contain a complexing agent, a pH modifier, a buffer and a stabilizer, if necessary. In order to form a high-purity nickel film, it is preferable to use a hydrazine derivative, such as hydrazine hydrate, hydrazine sulfate or hydrazine oxide, as a reducing agent. In the electroless plating, for example, a long nonwoven fabric strip is continuously dipped into a catalyzing bath and then a plating bath and is wound up. Alternatively, a rolled nonwoven fabric strip is plated by forcibly circulating a plating solution in a cheese-dyeing machine. The rolled strip may be subjected to only a catalytic step or an electroless plating step, or to both steps.

Furthermore, an electroplating film 12$b$ is formed, if necessary, using a plating bath. Examples of known plating baths are a Watts bath, a chloride bath and a sulfamate bath. The plating bath may contain other additives, e.g., a pH buffer and a surfactant. A direct current or a pulsed intermittent current is applied between the nonwoven fabric after the electroless plating as the cathode, and a nickel counter electrode as the anode, in the bath so that the electroplating film 12$b$ is deposited on the electroless plated film 12$a$.

The resulting collector for alkaline secondary batteries is formed of the nonwoven fabric 11, which is composed of a polyolefin fiber and/or a polyamide fiber. These fibers have been used in battery separators and are reliable. Since the nonwoven fabric 11 is hydrophilized by a treatment (particularly, by sulfonation, gaseous fluorine treating, or vinyl monomer grafting), the nonwoven fabric 11 has uniform and fine negative charge over the entire region. Moreover, nickel ions are firmly affixed to the nonwoven fabric 11 during nickel plating. Thus, in the collector 10, the plated nickel, film is tightly bonded to the nonwoven fabric 11, improving conductivity.

Preferably, the nonwoven fabric has a plurality of micropores extending from one surface to the other surface thereof. These micropores also retain the active material. Since the amount of the active material loaded into the nonwoven fabric increases, the resulting alkaline secondary battery has high capacity. Preferably, the micropores can be formed by punching. Alternatively, the micropores may be formed by local melting or ablation of the nonwoven fabric by heat or laser.

An alkaline secondary battery of the present invention will now be described with reference to the drawings.

Figure 2:
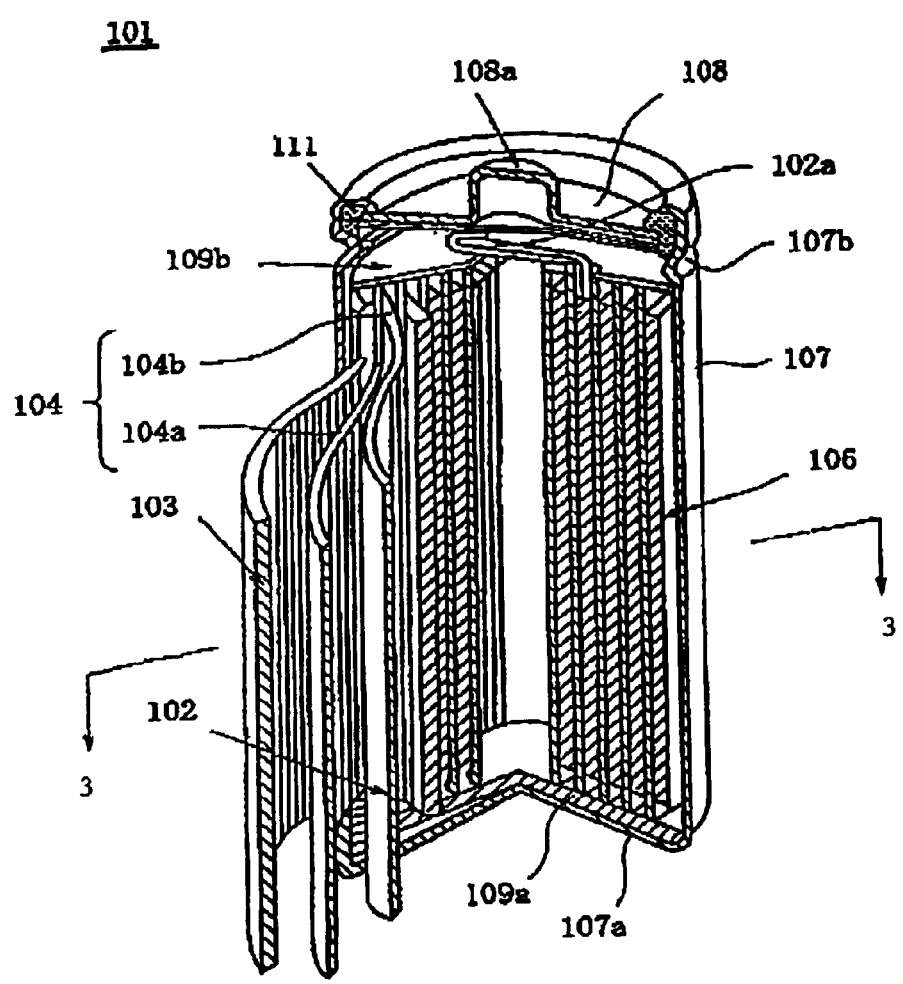
FIG. 2 is an isometric partially broken-away view of an alkaline secondary battery in accordance with the present invention.

As shown in FIG. 2, an alkaline secondary battery 101 of the present invention includes the above-mentioned collector, which is hydrophilized by a treatment (particularly, by sulfonation, gaseous fluorine treating, or vinyl monomer grafting). The battery 101 further includes a strip positive electrode 102 and a strip negative electrode 103 which are a part of this collector. The positive electrode 102 and the negative electrode 103 are separated by strip separators 104. These are wound up into a roll to form an electricity-generating component 106. The battery 101 has a conductive case 107 which also functions as an external negative electrode. The electricity-generating component 106 is loaded in the case 107. The top of the case 107 is sealed using a sealing plate 108 which also functions as an external positive electrode.

The positive electrode 102 is formed as follows. A strip collector is flattened at a portion for providing a terminal, and the pores are filled with a positive electrode paste containing a positive active material. A small nickel piece 102$a$ as an external terminal is spot-welded to the flattened portion. The negative electrode 103 is formed as follows. Another strip collector is flattened at a portion for providing a terminal, and the pores are filled with a negative electrode paste containing a negative active material. A small nickel piece (not shown in the drawing) as another external terminal is spot-welded to the flattened portion. The separators 104 include a first separator 104$a$ disposed between the positive electrode 102 and the negative electrode 103 and a second separator 104$b$ disposed on the outer surface of the negative electrode 103. The first and second separators 104$a$ and 104$b$, respectively, prevent short-circuiting between the positive electrode 102 and the negative electrode 103 and retain an electrolyte solution.

The case 107 is a cylinder having a bottom 107$a$ and the sealing plate 108 seals the opening at the top of the case 107. The electricity-generating component 106 is placed into the case 107 so that the negative electrode 103 comes into contact with the inner surface of the case 107. The sealing plate 108 has a projection 108$a$ as a positive electrode terminal of the battery. The bottom 107$a$ and the electricity-generating component 106 are isolated from each other by a lower insulator 109$a$. Moreover, an upper insulator 109$b$ is placed on the electricity-generating component 106 in the case 107. The lower insulator 109$a$ has a slit provided for inserting the nickel piece, which is spot-welded to the negative electrode 103, while the upper insulator 109$b$ has a slit provided for inserting the nickel piece 102$a$ which is spot-welded to the positive electrode 102. The end of the nickel piece welded to the negative electrode 103 is connected to the bottom 107$a$ through the slit of the lower insulator 109$a$, while the end of the nickel piece 102$a$ welded to the positive electrode 102 is connected to the sealing plate 108 through the slit of the upper insulator 109$b$.

After the upper insulator 109$b$ is inserted into the case 107, a ring constriction 107$b$ is formed at the upper portion of the case 107 in the vicinity of the case 107. The sealing plate 108 connected to the nickel piece 102$a$ of the positive electrode 102 is arranged on the ring constriction 107$b$ using a ring insulating packing 111 provided therebetween. The top edge of the case 107 is folded upwardly together with the insulating packing 111 so that the sealing plate 108 is electrically insulated from the case 107 and that the case 107 is sealed by the sealing plate 108.

In such a battery 101, the first separator 104*a* is laminated on the outer surface of the positive electrode 102, and then the negative electrode 103 and the second separator 104*b* are laminated on the outer surface of the first separator 104*a*. The laminate is wound into a roll. The electricity-generating component 106 is thereby fabricated. The collector composed of a hydrophilic nonwoven fabric coated with nickel is flexible compared to a conventional collector with a nickel network skeleton. Thus, the positive electrode 102 and the negative electrode 103 composed of the flexible collectors can be readily wound into a roll, facilitating assembly of the battery 101.

In the collector of the present invention, the plated nickel firmly adheres to the hydrophilic nonwoven fabric. The nickel plated layer does not undergo a change in quality or partial scaling during assembling a battery and repeated charge/discharge cycles of the battery. The resulting battery exhibits a high discharge rate and improved charge/discharge cycle characteristics compared to conventional batteries.

Figure 4:
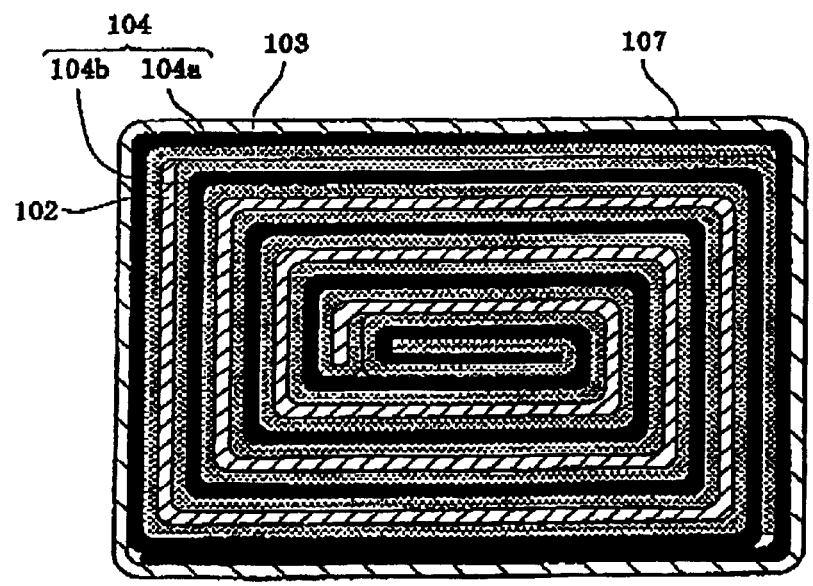
FIG. 4 is a cross-sectional view of a rectangular spiral collector.
Figure 5:
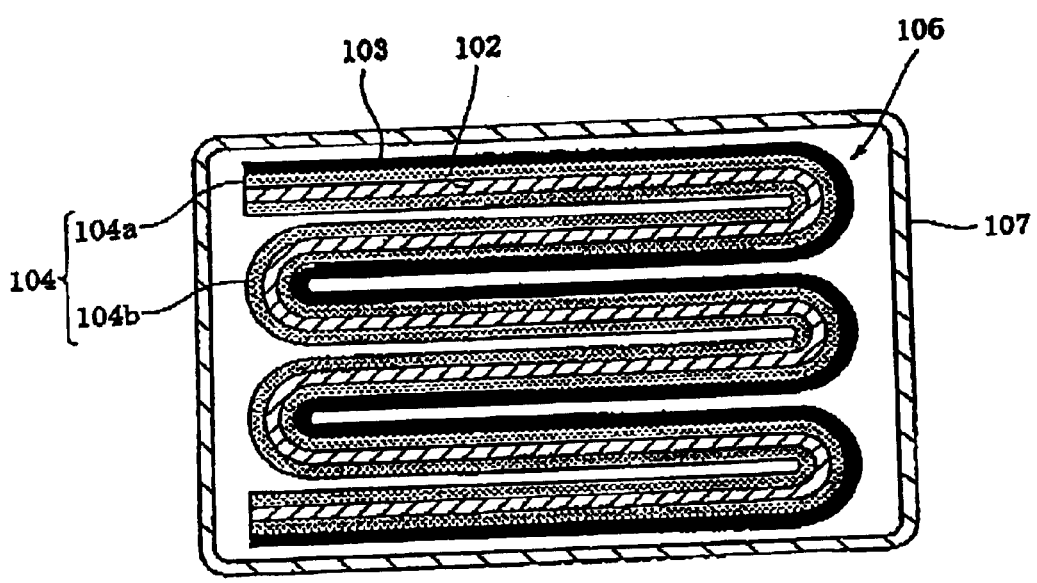
FIG. 5 is a cross-sectional view of a folded laminate collector.

In the above embodiment, the battery is cylindrical. That is, the rolled electricity-generating component 106 is contained in the cylindrical case 107. The battery case may be prismatic in the present invention. The electricity-generating component may be composed of a rectangular spiral roll of the positive electrode 102 and the negative electrode 103 as shown in FIG. 4, or may be composed of a folded laminate as shown in FIG. 5.

EXAMPLES

The present invention will now be described in more detail with the following EXAMPLES and COMPARATIVE EXAMPLES.

Example 1

A fiber web was formed by a conventional wet process using a slurry containing a core-sheath composite fiber of a polypropylene core and a polyethylene sheath having a fineness of 1.2 dtex and a length of 5 mm and a solvent. The fiber web was heated to 135° C. using a drier to melt the sheath component of the core-sheath composite fiber. The resulting nonwoven fabric had a density (per unit area) of 65 g/m², a thickness of 0.5 mm and a porosity of 86%.

The nonwoven fabric was immersed into fuming sulfuric acid at 80° C. to hydrophilize the nonwoven fabric by sulfonation. The resulting hydrophilic nonwoven fabric was subjected to a nickel plating treatment. In the nickel plating treatment, the hydrophilic nonwoven fabric was wounded onto a carrier of a dyeing machine, and a scouring agent was circulated. After the hydrophilic nonwoven fabric was washed with water, an aqueous solution containing 10 g/liter of tin(11) chloride and 20 ml/liter of hydrochloric acid was circulated, followed by washing the nonwoven fabric with water. Next, an aqueous solution containing 1 g/liter of palladium chloride and 20 ml/liter of hydrochloric acid was circulated to catalyze the surface of the nonwoven fabric.

The nonwoven fabric was washed with water, and an electroless nickel solution was circulated at 80° C. in which the plating solution contained 18 g/liter of nickel sulfate, 10 g/liter of sodium citrate, 50 ml/liter of hydrazine hydrate, and 100 ml/liter of 25% aqueous ammonia, and the volume of the solution was determined so as to contain 55% by weight of nickel with respect to the total weight of the collector after the plating treatment. When the plating solution became almost clear after one hour, the circulation was completed, and the nonwoven fabric was washed with water and was dried to form a collector. The plated nickel content of the collector, calculated from the difference in weight of the nonwoven fabric, was 50% by weight.

Example 2

A nonwoven fabric was prepared as in EXAMPLE 1. The nonwoven fabric was introduced into a vessel filled with a gaseous mixture of fluorine (3% by volume), oxygen (5% by volume), sulfur dioxide (5% by volume), and nitrogen (87% by volume) for 120 seconds to hydrophilize the nonwoven fabric. The hydrophilic nonwoven fabric was subjected to nickel plating as in EXAMPLE 1. The plated nickel content of the collector was 50% by weight.

Example 3

A nonwoven fabric was prepared as in EXAMPLE 1. The nonwoven fabric was subjected to punching so that the nonwoven fabric had a plurality of micropores, extending from one surface to the other surface and having a diameter of 1 mm, wherein the pitch between the micropores was 8 mm and the number thereof was about 1.5/cm². This nonwoven fabric was hydrophilized as in EXAMPLE 2. The hydrophilic nonwoven fabric was subjected to nickel plating as in EXAMPLE 1. The plated nickel content of the collector was 50% by weight.

Example 4

A graft polymerization solution was prepared. The graft polymerization solution contained 30% by weight of an acrylic monomer, 0.1% by weight of benzophenone, 0.4% by weight of iron sulfate, 0.1% by weight of a non-tonic surfactant, and 69.4% by weight of water.

A nonwoven fabric was prepared as in EXAMPLE 1. The nonwoven fabric was immersed into the graft polymerization solution so that 0.8 weight percent of the monomer solution was retained in the nonwoven fabric. Both surfaces of the nonwoven fabric were irradiated with ultraviolet light with a 365-nm maximum wavelength and an intensity of 180 mW/cm² for 20 seconds using two metal halide mercury lamps provided on the both surface to complete graft polymerization. The resulting nonwoven fabric was washed with water and was dried. An acrylic-grafted nonwoven fabric was prepared in such a manner. The hydrophilic nonwoven fabric was subjected to nickel plating as in EXAMPLE 1. The plated nickel content of the collector was 50% by weight.

Comparative Example 1

A nonwoven fabric was prepared as in EXAMPLE 1. The nonwoven fabric was placed into an AC corona discharging machine (made by Kasuga Electric Works Ltd.; electrode: aluminum Type 3) and was treated for 1 minute at an electrode distance of 2 mm, a discharge cycle of 120 times/min, a frequency of 10 kHz, and a power of 1.5 kW. The corona-treated nonwoven fabric was subjected to nickel plating as in EXAMPLE 1. The plated nickel content of the collector was 50% by weight.

Comparative Example 2

A nonwoven fabric was prepared as in EXAMPLE 1. The nonwoven fabric was subjected to nickel plating as in EXAMPLE 1 without hydrophilization. The plated nickel content of the collector was 50% by weight.

TEST 1

Regarding the collectors of EXAMPLES 1 to 4 and COMPARATIVE EXAMPLES 1 and 2, the surface resistance was measured using a surface resistance meter (LORESTA AP, made by Mitsubishi Petrochemical Co. Ltd.,) with a 4-pin probe having a distance of 5 mm. Also, the surface resistance of the collectors, which were immersed at 60° C. into an aqueous potassium hydroxide solution with a density of 1.3 for 10 days, were washed, and were dried, was measured using the same apparatus.

The adhesiveness of the plated nickel to the nonwoven fabric was measured by a tape peeling-off test. An adhesive tape (Nitto 31B, made by Nitto Denko Corporation) was bonded to the surface of a collector, and was strongly pressed by a finger. One end of the tape was stretched to peel off the tape from the collector surface. Delamination of the plated nickel from the nonwoven fabric was observed.

The tensile strength of the collector was measured using a test piece with a width of 50 mm of the collector by a tensile tester (Tensilone UCT-500, made by Orientech Co. Ltd.). The collector was fastened by a pair of chucks at a spacing of 100 m, and was stretched at a rate of 300 mm/min. The tensile strength was determined by the maximum load before the collector was broken. These results are shown in Table 1.

TABLE 1

| | Hydrophilic Treatment | Tensile Strength (kg/5 cm) | Resistance ($\Omega$) Initial | Resistance ($\Omega$) Immersed | Adhesiveness (Delamination of Plated Nickel) |
|---|---|---|---|---|---|
| EXAMPLE 1 | Sulfonation | 16 | $2 \times 10^{-2}$ | $2.3 \times 10^{-2}$ | Not Observed |
| EXAMPLE 2 | Fluorination | 16 | $2 \times 10^{-2}$ | $4.2 \times 10^{-2}$ | Not Observed |
| EXAMPLE 3 | Fluorination | 15 | $2 \times 10^{-2}$ | $4.2 \times 10^{-2}$ | Not Observed |
| EXAMPLE 4 | Acrylic Grafting | 16 | $2 \times 10^{-2}$ | $4.4 \times 10^{-2}$ | Not Observed |
| COMPARATIVE EXAMPLE 1 | Corona Treatment | 16 | $2 \times 10^{-2}$ | $8 \times 10^{-1}$ | Observed |
| COMPARATIVE EXAMPLE 2 | Untreated | 14 | $2 \times 10^{-2}$ | 1.2 | Observed |

EVALUATION 1

The results shown in Table 1 demonstrate that the adhesiveness of the collectors after the hydrophilic treatment of the present invention (EXAMPLES 1 to 4) is superior to that of the collectors after the Corona treatment (COMPARATIVE EXAMPLES 1 and 2), although the tensile strength and the initial resistance are substantially the same level in all the samples. In the hydrophilic nonwoven fabric of the present invention, a continuous nickel film is formed by electroless plating and the plated nickel is firmly affixed to the-surface of the nonwoven fabric. In contrast, the surface modification by the corona treatment is insufficient.

Although the sample having a plurality of micropores (EXAMPLE 3) is slightly inferior to the sample not having micropores (EXAMPLE 2) in tensile strength, the tensile strength in EXAMPLE 3 is larger than 13 kg/5-cm width, which is the minimum requirement for collectors. Accordingly, the collectors in EXAMPLES 1 to 4 are suitable for practical use.

Examples of the alkaline secondary battery of the present invention will now be described.

Examples 5

A plurality of collectors was prepared as in EXAMPLE 1. The gap portion of each collector was filled with a positive electrode paste or a negative electrode paste. Each collector was dried, was rolled, and was cut into a predetermined size. A nickel piece as an external terminal was spot-welded to each cut collector to prepare a positive electrode or a negative electrode. Herein, the positive electrode paste contained 90 percent by weight of powdered nickel hydroxide, 8 percent by weight of powdered carbonyl nickel as a conductive auxiliary, 2 percent by weight of powdered cobalt monoxide, carboxymethyl cellulose as a thickener, and polytetrafluoroethylene as a tackifier. The negative electrode paste contained a powdered hydrogen occluding alloy as a base, carboxymethyl cellulose as a, thickener, and polytetrafluoroethylene as a tackifier.

Example 6

A plurality of collectors was prepared as in EXAMPLE 2. The gap portion of each collector was filled with a positive electrode paste or a negative electrode paste, which is the same as that in EXAMPLE 5. Each collector was dried, was rolled, and was cut into a predetermined size. A nickel piece as an external terminal was spot-welded to each out collector to prepare a positive electrode and a negative electrode.

Example 7

A plurality of collectors was prepared as in EXAMPLE 4. The gap portion of each collector was filled with the positive electrode paste or the negative electrode paste, which is the same as that in EXAMPLE 5. Each collector was dried, was rolled, and was cut into a predetermined size. A nickel piece as an external terminal was spot-welded to each cut collector to prepare a positive electrode and a negative electrode.

Comparative Example 3

A polyurethane foam sheet having a porous network skeleton was subjected to known nickel plating, and was fired in a reducing atmosphere to pyrolyze the polyurethane resin while remaining the plated nickel network skeleton. A plurality of collectors with three-dimensional network structures was prepared in such a manner. The gap portion of each collector was filled with a positive electrode paste or a negative electrode paste, which was the same as that in EXAMPLE 5. Each collector was dried, was rolled, and was cut into a predetermined size. A nickel piece as an external terminal was spot-welded to each cut collector as in EXAMPLE 5 to prepare a positive electrode and a negative electrode.

Comparative Example 4

A plurality of collectors having the same structure as that in COMPARATIVE EXAMPLE 2 was prepared as in COM- PARATIVE EXAMPLE 2. The gap portion of each collector was filled with a positive electrode paste or a negative electrode paste, which was the same as that in EXAMPLE 5. Each collector was dried, was rolled, and was cut into a predetermined size. A nickel piece as an external terminal was spot-welded to each cut collector to prepare a positive electrode and a negative electrode.

Comparative Example 5

A plurality of collectors having the same structure as that in COMPARATIVE EXAMPLE 1 was prepared as in COMPARATIVE EXAMPLE 1. That is, nonwoven fabrics were subjected to nickel plating without a hydrophilic treatment. The gap portion of each collector was filled with a positive electrode paste or a negative electrode paste, which was the same as that in EXAMPLE 5. Each collector was dried, was rolled, and was cut into a predetermined size. A nickel piece as an external terminal was spot-welded to each cut collector to prepare a positive electrode and a negative electrode.

TEST 2

Figure 3:
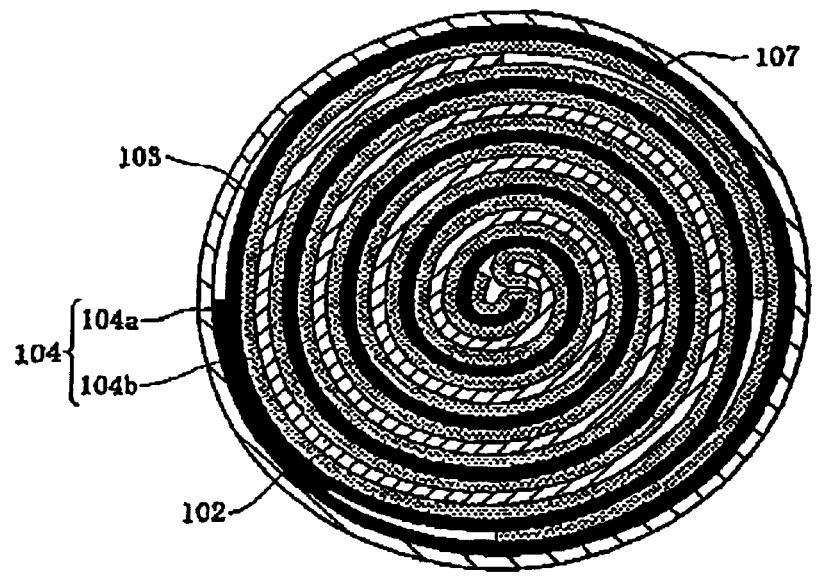
FIG. 3 is a cross-sectional view taken from line 3—3 in FIG. 2, showing a spirally wound collector.

A plurality of cylindrical battery cases with a Sub-C size and a plurality of prismatic battery cases of 6.1 mm by 17.0 mm by 67.0 mm in outer sizes were prepared. A melt-type nonwoven fabric separator of a core-sheath composite fiber composed of a polypropylene core and a polyethylene sheath was prepared. Any one of the positive electrodes and any one of the negative electrodes in EXAMPLES 5 and COMPARATIVE EXAMPLES 3 and 4 were selected and were laminated with the separator therebetween to form laminates. Laminates were wound into a spiral roll as shown in FIG. 3, a rectangular spiral roll as shown in FIG. 4, and a folded laminate as shown in FIG. 5 to form electricity-generating components. Each electricity-generating component was inserted into a cylindrical or prismatic battery case. The negative-electrode external terminal was welded to the bottom of the battery case, which functions as a negative electrode. After the battery case was necked, a predetermined amount of alkaline electrolyte solution was placed therein. The top of the case was sealed with a sealing plate, which also functions as a positive terminal, to complete an alkaline secondary battery. Twenty-seven alkali secondary batteries having a rated capacity of 2,500 mAh or 1,300 mAh were fabricated in such a manner. The internal resistance of each battery was measured. Table 2 shows the capacities of the positive electrode and the negative electrode and the combination thereof, the shape and the weight energy density of the electricity-generating component, the type of the battery case, and the observed internal resistance in each of the twenty-seven alkali secondary batteries.

TABLE 2

| | Positive Electrode | | Negative Electrode | | Electricity-generating Component | | | |
|---|---|---|---|---|---|---|---|---|
| Battery | Type | Capacity (mAh) | Type | Capacity (mAh) | Shape | Energy Density (Wh/kg) | Shape of Case | Internal Resistance (mΩ) |
| 1 | EXAMPLE 5 | 2,452 | EXAMPLE 5 | 3,457 | Spiral | 134 | Cylinder | 15.3 |
| 2 | | 1,248 | | 1,843 | RS(*1) | 128 | Prism | 14.6 |
| 3 | | 1,347 | | 1,887 | Folded | 137 | Prism | 14.8 |
| 4 | EXAMPLE 5 | 2,537 | COMPARATIVE | 3,561 | Spiral | 106 | Cylinder | 16.1 |
| 5 | | 1,260 | EXAMPLE 3 | 1,801 | RS(*1) | 103 | Prism | ISC(*2) |
| 6 | | 1,308 | | 1,857 | Folded | 102 | Prism | ISC(*2) |
| 7 | EXAMPLE 5 | 2,538 | COMPARATIVE | 3,576 | Spiral | 118 | Cylinder | 23.6 |
| 8 | | 1,248 | EXAMPLE 4 | 1,769 | RS(*1) | 124 | Prism | 25.3 |
| 9 | | 1,339 | | 1,882 | Folded | 120 | Prism | 24.9 |
| 10 | COMPARATIVE | 2,553 | EXAMPLE 5 | 3,599 | Spiral | 110 | Cylinder | 16.4 |
| 11 | EXAMPLE 3 | 1,309 | | 1,846 | RS(*1) | 104 | Prism | ISC(*2) |
| 12 | | 1,314 | | 1,853 | Folded | 108 | Prism | ISC(*2) |
| 13 | COMPARATIVE | 2,439 | EXAMPLE 5 | 3,485 | Spiral | 120 | Cylinder | 37.6 |
| 14 | EXAMPLE 4 | 1,276 | | 1,848 | RS(*1) | 118 | Prism | 38.2 |
| 15 | | 1,293 | | 1,901 | Folded | 121 | Prism | 36.9 |
| 16 | COMPARATIVE | 2,452 | COMPARATIVE | 3,457 | Spiral | 94 | Cylinder | 15.1 |
| 17 | EXAMPLE 3 | 1,262 | EXAMPLE 3 | 1,779 | RS(*1) | 93 | Prism | ISC(*2) |
| 18 | | 1,305 | | 1,844 | Folded | 95 | Prism | ISC(*2) |
| 19 | COMPARATIVE | 2,537 | COMPARATIVE | 3,654 | Spiral | 105 | Cylinder | 23.8 |
| 20 | EXAMPLE 3 | 1,356 | EXAMPLE 4 | 1,954 | RS(*1) | 109 | Prism | ISC(*2) |
| 21 | | 1,308 | | 1,839 | Folded | 108 | Prism | ISC(*2) |
| 22 | COMPARATIVE | 2,538 | COMPARATIVE | 3,564 | Spiral | 103 | Cylinder | 37.9 |
| 23 | EXAMPLE 4 | 1,360 | EXAMPLE 3 | 1,918 | RS(*1) | 110 | Prism | ISC(*2) |
| 24 | | 1,337 | | 1,880 | Folded | 103 | Prism | ISC(*2) |
| 25 | COMPARATIVE | 2,553 | COMPARATIVE | 3,625 | Spiral | 118 | Cylinder | 42.8 |
| 26 | EXAMPLE 4 | 1,275 | EXAMPLE 4 | 1,838 | RS(*1) | 125 | Prism | 43.1 |
| 27 | | 1,264 | | 1,770 | Folded | 126 | Prism | 44.0 |

(*1)Rectangular Spiral; (*2)Internal Short-circuiting

TEST 3

Batteries 1, 4, 7, 10, 13, 16, 19, 22, and 25 used in TEST 2 were prepared. Each battery was charged for 6 hours at a charge rate C/5, wherein C was the capacity of the battery, and was allowed to stand for 1 hour. Next, the battery was discharged at a discharge rate of 10C until the voltage became 0.8 V to measure the discharge capacity C1 at this time. The high-rate discharge characteristic R1 represented by the ratio C/C1 was thereby determined.

Furthermore, each battery was charged for 6 hours at a charge rate C/5 and was allowed to stand for 1 hour. The battery was discharged at 400 mAh until the voltage became 0.9 V. This charge/discharge operation was repeated 500 times to determine the high-rate discharge characteristic R2 represented by $C_{500}/C_{MAX}$ wherein $C_{500}$ was the discharge capacity at the 500th cycle and $C_{MAX}$ was the maximum discharge capacity in the 500 cycles.

Table 3 shows the high-rate discharge characteristics R1 and R2.

TABLE 3

| Battery | Positive Electrode | Negative Electrode | R1 | R2 |
|---|---|---|---|---|
| 1 | EXAMPLE 5 | EXAMPLE 5 | 87 | 91 |
| 4 | EXAMPLE 5 | COMPARATIVE EXAMPLE 3 | 86 | 90 |
| 7 | EXAMPLE 5 | COMPARATIVE EXAMPLE 4 | 49 | 10 |
| 10 | COMPARATIVE EXAMPLE 3 | EXAMPLE 5 | 88 | 92 |
| 13 | COMPARATIVE EXAMPLE 4 | EXAMPLE 5 | 50 | 12 |
| 16 | COMPARATIVE EXAMPLE 3 | COMPARATIVE EXAMPLE 3 | 88 | 89 |
| 19 | COMPARATIVE EXAMPLE 3 | COMPARATIVE EXAMPLE 4 | 48 | 13 |
| 22 | COMPARATIVE EXAMPLE 4 | COMPARATIVE EXAMPLE 3 | 49 | 14 |
| 25 | COMPARATIVE EXAMPLE 4 | COMPARATIVE EXAMPLE 4 | 20 | Undischarged |

TEST 4

A plurality of cylindrical battery cases with a Sub-C size was prepared. A melt-type nonwoven fabric separator of a core-sheath composite fiber composed of a polypropylene care and a polyethylene sheath was prepared to form positive electrodes in EXAMPLES 5, 6, and 7 and COMPARATIVE EXAMPLES 4 and 5 and negative electrodes in COMPARATIVE EXAMPLE 3. Each of the positive electrodes and the negative electrodes was laminated with a separator therebetween, and each laminate was coiled as shown in FIG. 3 to form an electricity-generating component. The electricity-generating component was inserted into the cylindrical battery case. The negative-electrode external terminal was welded to the bottom of the battery case, which functions as a negative electrode. After the battery case was necked, a predetermined amount of alkaline electrolyte solution was placed therein to prepare five alkaline secondary batteries (Batteries 28 to 32).

Each battery was charged for 6 hours at a charge rate C/5 and was allowed to stand for 1 hour wherein C was the capacity of the battery. The battery was discharged at 400 mAh until the voltage became 0.9 V. This charge/discharge cycled operation was repeated 500 times. The number of the repeated cycles when the discharge capacity decreased to 80% of the maximum discharge capacity $C_{MAX}$ among the 500 discharge capacities was defined as the cycle life of the battery. Table 4 shows the cycle life and the internal resistance when the cycle life was determined.

TABLE 4

| Battery | Positive Electrode | Negative Electrode | Cycle Life | Internal Resistance (mΩ) |
|---|---|---|---|---|
| 28 | EXAMPLE 5 | COMPARATIVE EXAMPLE 3 | >500 cycles | 16.1 |
| 29 | EXAMPLE 6 | COMPARATIVE EXAMPLE 3 | >500 cycles | 18.8 |
| 30 | EXAMPLE 7 | COMPARATIVE EXAMPLE 3 | >500 cycles | 19.5 |
| 31 | COMPARATIVE EXAMPLE 4 | COMPARATIVE EXAMPLE 3 | 270 | 35.5 |
| 32 | COMPARATIVE EXAMPLE 5 | COMPARATIVE EXAMPLE 3 | 230 | 37.9 |

EVALUATION 2

Table 2 shows that all the batteries including the rectangular spiral electricity-generating components or the folded electricity-generating components formed of the positive or negative electrode in EXAMPLE 3 are internally short-circuited. The reason for this phenomenon is presumed as follows. The nickel itself constituting the network skeleton is less flexible in the electrode in COMPARATIVE EXAMPLE 3. When a laminate including this electrode is wound up or folded, the network skeleton of the collector breaks. As a result, the network skeleton has cracks and projections producing scuffing on the outer periphery of the electrode using this collector, due to chipping of the electrode collector. These projections break through the separator and cause short-circuiting.

Table 3 shows that the batteries including the positive electrode or the negative electrode in COMPARATIVE EXAMPLE 4 exhibit high-rate discharge characteristics and cycle characteristics which are inferior to those of the other batteries. Battery 25 using the positive electrode and the negative electrode of COMPARATIVE EXAMPLE 4 is undischargeable before the completion of the 500 cycles. The reason for this phenomenon is presumed as follows. Since the nonwoven fabric is plated with nickel without a hydrophilic treatment in the electrode in COMPARATIVE EXAMPLE 4, the adhesion of the plated nickel to the nonwoven fabric is insufficient. The plated nickel layer undergoes a change in quality or partial scaling from the nonwoven fabric during assembling a battery and repeated charge/discharge cycles of the battery.

In contrast, Table 2 shows that all the batteries including the electricity-generating components formed of the positive electrode or the negative electrode in EXAMPLES 5 and not causing internal short-circuiting exhibit low internal resistance and satisfactory collecting functions in all the battery shapes compared to the other batteries. Moreover, Table 3 shows that all the batteries including the electricity-generating components formed of the positive electrode and the negative electrode in EXAMPLE 5 are superior in high-rate discharge characteristics and cycle characteristics compared to the other batteries. The reason is presumed as follows. The collector of the present invention is more flexible compared to that in COMPARATIVE EXAMPLE 3 and exhibits adequate adhesiveness between the plated nickel film and the nonwoven fabric compared to that in COMPARATIVE EXAMPLE 4.

Table 4 shows that the batteries including the electricity-generating components formed of the positive electrodes in COMPARATIVE EXAMPLES 4 and 5 exhibit cycle characteristics inferior to those of the other batteries. As evidently shown in TEST 1, these results are presumably due to the delamination of the plated film by the alkaline electrolyte solution in the battery or an increased internal resistance due to the increased surface resistance of the collector.

According to the present invention, as described above, a nonwoven fabric comprising at least one of a polyolefin fiber and a polyamide fiber is hydrophilized, and the hydrophilic nonwoven fabric is plated with nickel. Thus, the hydrophilic nonwoven fabric has a uniform and fine negative charge over the entire region due to improved penetrability of a plating solution. Thus, nickel ions are firmly affixed to the surface of the nonwoven fabric in a nickel plating treatment, the plated nickel layer tightly bonded to the nonwoven fabric. The resulting collector exhibits high conductivity.

Since the nonwoven fabric has a plurality of micropores extending from one surface to the other surface thereof, a large amount of active material is loaded into the plurality of micropores, so that the alkaline secondary battery using this collector has high capacity.

Since the nonwoven fabric including crimped fibers is bulky, it can load an increased amount of active material, resulting in an increase in capacity of the alkaline secondary battery. Moreover, the average pore volume increases; hence a further increased amount of active material can be loaded. Since the nonwoven fabric prepared by a wet process is uniform with regard to area weight and thickness, a uniform electrode is obtainable. Thus, an electrode with a uniform thickness can be formed using this collector. When this electrode is wound up, an electrode group having high adhesiveness is formed, and a battery using the wound electrode exhibits superior charge/discharge characteristics.

Since the surface of the nonwoven fabric is hydrophilized by sulfonation, gaseous fluorine treating, or vinyl monomer grafting, the quality of the resulting collector is stable. When the nickel plating is electroless plating, the electroless plating facilitates the formation of a stable nickel film on the nonconductive nonwoven fabric. When an electroplating film is formed by an electroplating process subsequent to the formation of an electroless plating film by the electroless plating, the plated nickel film having a predetermined thickness is tightly bonded to the nonwoven fabric, and the resulting collector has desired conductivity.

In addition, an alkaline secondary battery can be readily assembled using the above-mentioned collector, and exhibits a high discharge rate and improved charge/discharge cycle characteristics due to high adhesiveness of the collector to the plated nickel layer.

What is claimed is:

1. A method for making a collector for an alkaline secondary battery, comprising:

a hydrophilizing step of hydrophilizing a nonwoven fabric comprising at least one of a polyolefin fiber and a polyamide fiber to produce a hydrophilic nonwoven fabric; and a plating step of applying nickel plating to the hydrophilic nonwoven fabric, wherein said hydrophilizing step includes a treatment selected from the group consisting of sulfonation and gaseous fluorine treating.

2. A method for making a collector for an alkaline secondary battery according to claim 1, wherein the nonwoven fabric has a plurality of micropores extending from one surface to the other surface thereof.

3. A method for making a collector for an alkaline secondary battery according to claim 1, wherein the nickel plating step comprises electroless plating.

4. A method for making a collector for an alkaline secondary battery according to claim 2, wherein the nickel plating step comprises electroless plating.

5. A method for making a collector for an alkaline secondary battery according to claim 3, wherein the step of electroless plating produces an electroless plating film.

6. A method for making a collector for an alkaline secondary battery according to claim 4, wherein the step of electroless plating produces an electroless plating film.

* * * * *